(12) United States Patent
Cleary

(10) Patent No.: US 8,038,957 B1
(45) Date of Patent: Oct. 18, 2011

(54) ELECTRIC CATALYTIC OXIDIZER

(76) Inventor: James M. Cleary, Falmouth, MA (US)

( * ) Notice: Subject to any disclaimer, the term of this patent is extended or adjusted under 35 U.S.C. 154(b) by 303 days.

(21) Appl. No.: 12/459,002

(22) Filed: Jun. 25, 2009

(51) Int. Cl.
  *B01D 50/00* (2006.01)
  *B01J 8/02* (2006.01)
  *F28D 21/00* (2006.01)

(52) U.S. Cl. ........ 422/181; 422/173; 422/177; 422/110; 422/111; 422/113; 422/199; 422/218; 422/202; 422/203; 422/204

(58) Field of Classification Search .................. 422/173, 422/177, 181, 110, 111, 113, 199, 202, 203, 422/204, 218
See application file for complete search history.

(56) References Cited

U.S. PATENT DOCUMENTS

| | | |
|---|---|---|
| 1,799,039 A | 3/1931 | Conejos |
| 3,882,934 A | 5/1975 | Knoos et al. |
| 4,770,857 A | 9/1988 | Ludwig |
| 4,911,894 A | 3/1990 | Retallick et al. |
| 4,983,364 A | 1/1991 | Buck et al. |
| 5,163,829 A | 11/1992 | Wildenberg |
| 5,326,537 A | 7/1994 | Cleary |
| 5,330,727 A | 7/1994 | Trocciola et al. |
| 5,567,390 A | 10/1996 | Cleary |
| 5,609,829 A | 3/1997 | Lucas et al. |
| 5,650,128 A | 7/1997 | Holst et al. |
| 6,282,371 B1 | 8/2001 | Martin et al. |
| 6,532,339 B1 | 3/2003 | Edgar et al. |
| 6,576,198 B2 | 6/2003 | Cash |
| 6,935,105 B1 | 8/2005 | Page et al. |
| 7,041,260 B1 | 5/2006 | Hong et al. |
| 7,147,036 B2 | 12/2006 | Ike |
| 7,332,136 B2 | 2/2008 | Heed |
| 7,399,451 B1 | 7/2008 | Heed |

*Primary Examiner* — Walter Griffin
*Assistant Examiner* — Lessanework Seifu
(74) *Attorney, Agent, or Firm* — John P. McGonagle

(57) ABSTRACT

A containment vessel having a spiral plate heat exchanger, a central catalyst chamber packed with particulate catalyst, a central heater, a plenum providing conductive flow access for a hydrocarbon-air mixture to and from the containment vessel interior, and essential flow pathways interconnecting the plenum section, heat exchanger, catalyst chamber and central heater. The spiral plate heat exchanger, catalyst chamber, and heater assembly occupy successively smaller annular regions within the containment vessel.

11 Claims, 17 Drawing Sheets

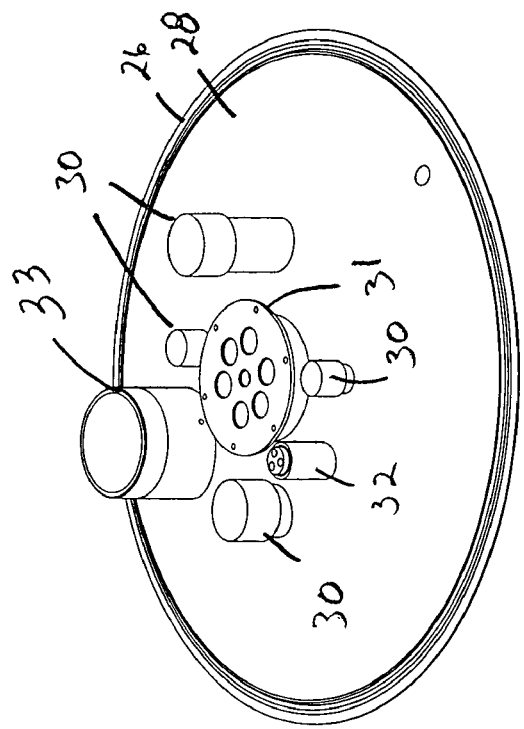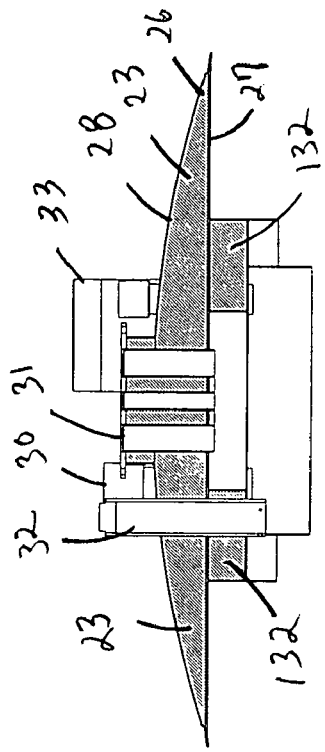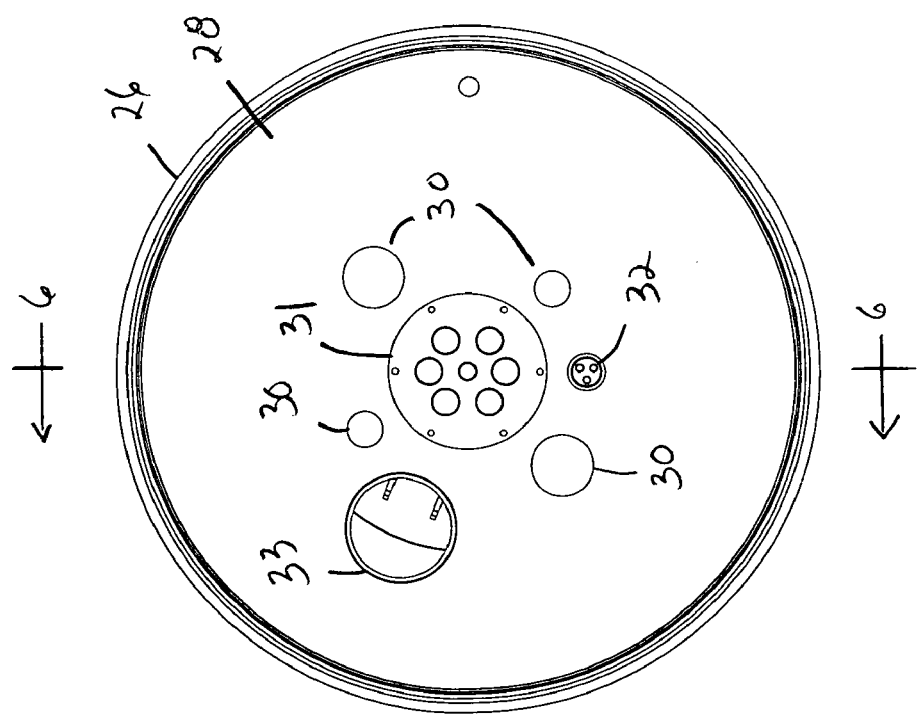

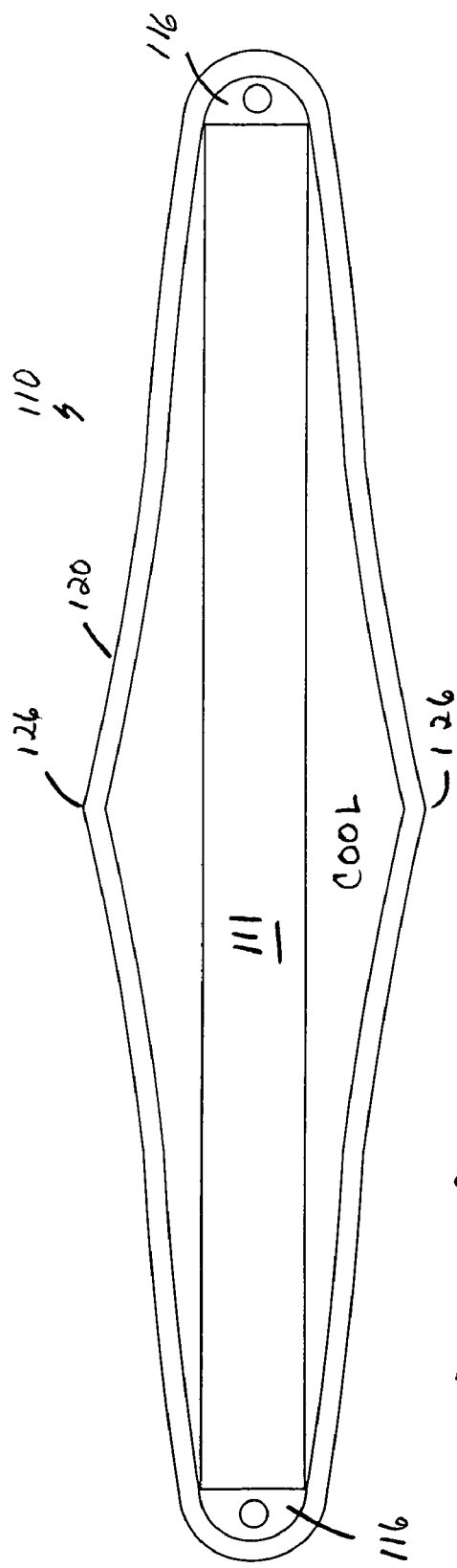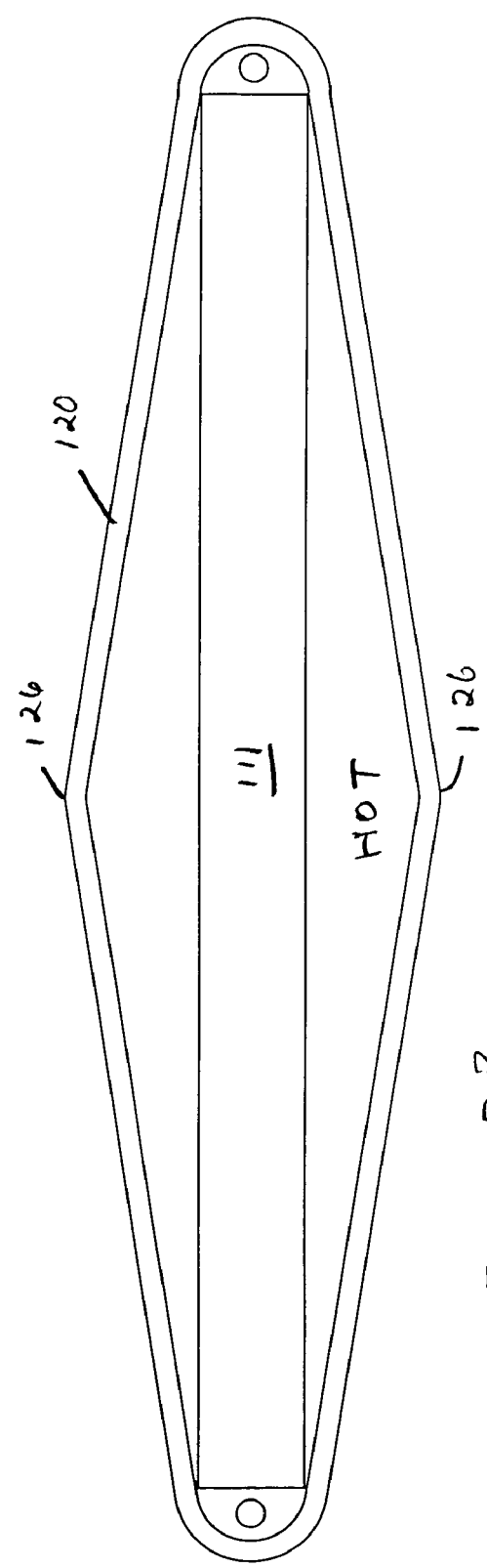
FIG. 17A
FIG. 17B

US 8,038,957 B1

ELECTRIC CATALYTIC OXIDIZER

BACKGROUND OF THE INVENTION

This invention relates generally to catalytic oxidizers, and in particular, to an electric catalytic oxidizer for the treatment of hydrocarbon vapors from soil hydrocarbon-air vapor mixture extraction systems, and vapor from manufacturing processes.

Typically the most common application of such catalytic oxidizers is in the destruction of vapors extracted in situ from soils that have been contaminated with hydrocarbons, typically by a hydrocarbon leak from a storage tank. Such applications normally involve the clean-up of vapors contained in an air stream generated during clean-up of hydrocarbon spills, i.e. soil vapor extraction systems. The advantage of a catalytic combustion process is that it can be operated at a much lower temperature and lower hydrocarbon concentration than is possible with ordinary flame combustion. Many applications involve very low concentrations of hydrocarbon where catalytic combustion is efficient, while flame combustion is not practical.

SUMMARY OF THE INVENTION

The primary objective of the present invention is to provide maximum heat recovery and reactor volume for a given amount of pressure containment volume and construction material. The present invention accomplishes this by providing a containment vessel having a spiral plate heat exchanger, a central catalyst chamber, a central heater, and essential flow pathways, forming a novel catalytic reactor providing efficient heat exchange for preheating reactants, while minimizing energy use, structural mass, and containment volume.

It is essential for the vapors being treated to be isolated from the exhaust side of the system until they have been completely treated. Applicant's prior patents, i.e., U.S. Pat. Nos. 5,326,537 ('537 patent) and 5,567,390 ('390 patent), incorporated herein by reference, also disclosed a spiral plate heat exchanger combined with a catalytic reactor. To fulfill this requirement with the basic configuration disclosed in Applicant's prior patents, i.e., '537 patent and '390 patent, a vessel within a vessel type construction was provided. It was necessary to construct a vessel enclosing the heater passage, inlet plenum, exhaust plenum, and the catalyst chamber. This inner vessel is also sealed to the inlet spiral. The inner vessel together with the spiral passages were enclosed within a main outer vessel. The inlet spiral, heater passage, inlet plenum, and catalyst chamber formed a sealed passage isolated from the exhaust side of the system except at the exhaust face of the catalyst.

The present invention eliminates the need to combine the inlet spiral, heater assembly, inlet plenum, and catalyst chamber as a continuous sealed envelope. This requirement is avoided by an annular construction with radial flow with central heater, cylindrical inlet screen, cylindrical catalyst chamber and cylindrical outlet screen. A packed bed of catalyst closely contacts the upper and lower walls of the vessel and radial passage. In this way the packed bed of catalyst provides the necessary sealing to prevent untreated vapor mixture from reaching the exhaust side of the system.

The basic construction of the present invention enables the breakdown and disassembly of the reactor into simple elements while still maintaining a highly compact integrated system. The present invention eliminates the need for the core assembly, a separate containment for inlet and outlet plenum, and catalyst chamber as disclosed in applicant's prior '537 and '390 patents.

The present invention also provides an improved heater assembly. Flow is introduced into the center of a roughly circular array of electric heaters. The heaters are connected to the flow in a parallel arrangement. Each heater is subject to approximately the same temperature rise and flow. In applicant's prior '537 and '390 patents the heaters were connected to the flow in series so that the downstream heater was subject to higher temperatures.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 4 is a perspective view of the top cover of the oxidizer.

FIG. 5 is a top view of the top cover.

FIG. 6 is a cross-sectional view of the top cover along the lines 6-6 of FIG. 5.

FIGS. 17A and 17B are profile views of the thermal actuator frames.

FIG. 18 is a view perpendicular to the bend axes of the thermal actuator frame showing the tapered width distribution of the frame.

DETAILED DESCRIPTION OF INVENTION

Figure 1:
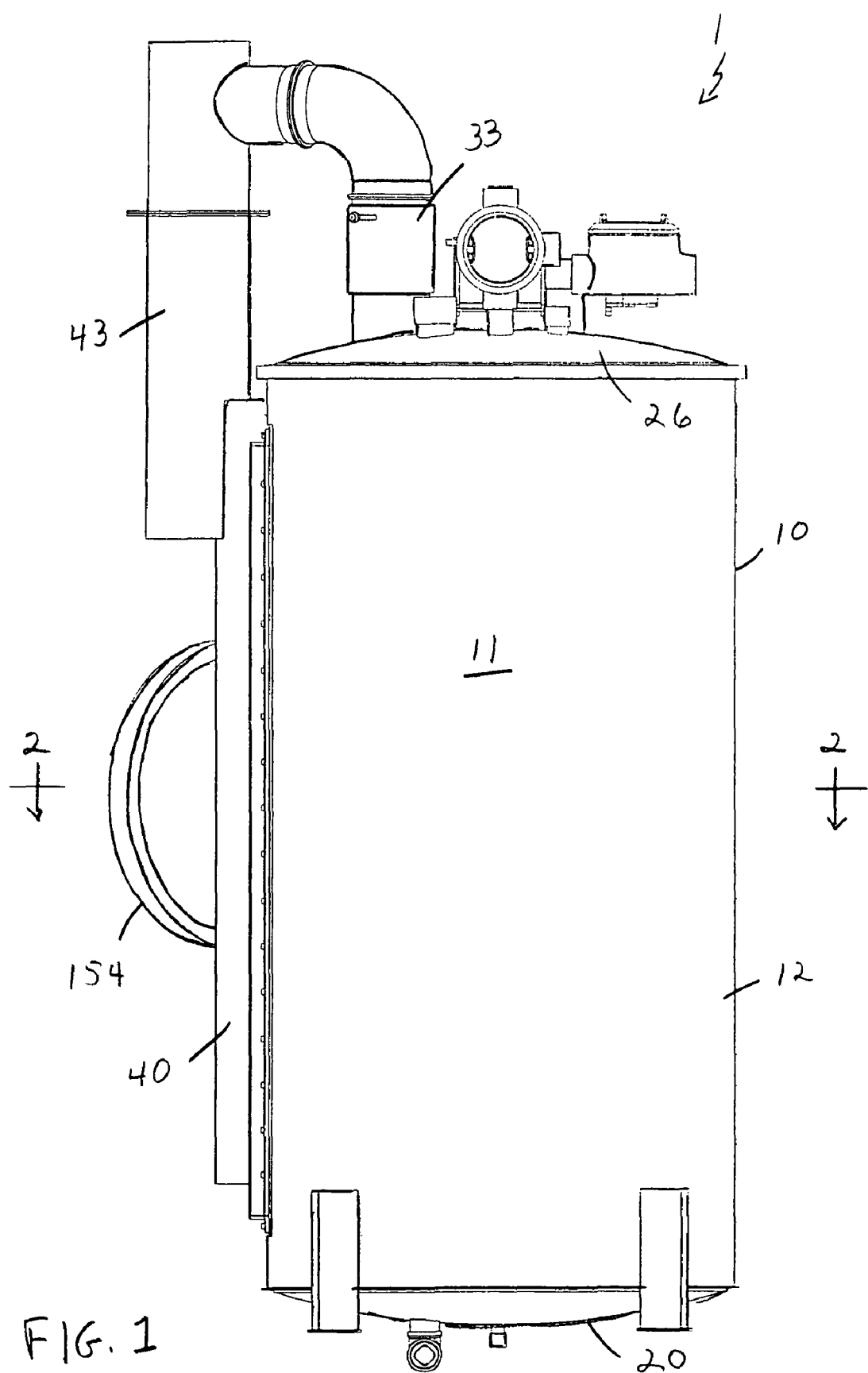
FIG. 1 is a side view of the invention electric catalytic oxidizer.

Referring to the drawings in detail wherein like elements are indicated by like numerals, there is shown an electric catalytic oxidizer 1 comprised of a containment vessel 10, a spiral heat exchanger 50 within said containment vessel, a heater assembly 90 centrally positioned within said containment vessel, a catalyst chamber 70 within said containment vessel and positioned between said spiral heat exchanger 50 and said heater assembly 90, and a plurality of essential flow pathways.

The containment vessel 10 has a bottom cover 20 from which a cylindrical side wall 11 extends vertically upward, said containment vessel 10 being generally cylindrical in shape, a vertical longitudinal axis of said cylindrical containment vessel being generally perpendicular to the bottom cover 20 of said containment vessel 10, said containment vessel 10 having a top cover 23 removably connected to said cylindrical side wall 11, said side wall, top cover and bottom cover defining a containment vessel interior 14. The containment vessel sidewall 11 has an exterior surface 12 and an interior surface 13. The containment vessel interior 14 has a vertical inner cylindrical screen plate 15 with a vertical longitudinal central axis coincident with a containment vessel vertical longitudinal axis. The containment vessel interior 14 also has a vertical outer cylindrical screen plate 16 with a vertical longitudinal central axis coincident with a containment vessel vertical longitudinal central axis. The outer cylindrical screen plate 16 is positioned between the inner cylindrical screen plate 15 and the containment vessel sidewall interior surface 13. The inner screen plate 15 defines a heater chamber 17 containing the invention heater assembly 90. The annular space 18 between the inner screen plate 15 and outer screen plate 16 defines a catalyst chamber 70. The annular space 19 between the outer screen plate 16 and the containment vessel side wall interior surface 14 holds the invention spiral heat exchanger 50. The annular space 61 between the outer screen plate 16 and the first coil of the spiral heat exchanger defines the outlet passage entry space 61. The containment vessel interior 14 may optionally contain an inner wall 34 adjacent and spaced from said inner wall interior surface 13. The space 35 between the inner wall interior surface 13 and inner wall 34 provides a holding space for thermal insulation 36. See FIGS. 1-3 and 13.

Figure 8:
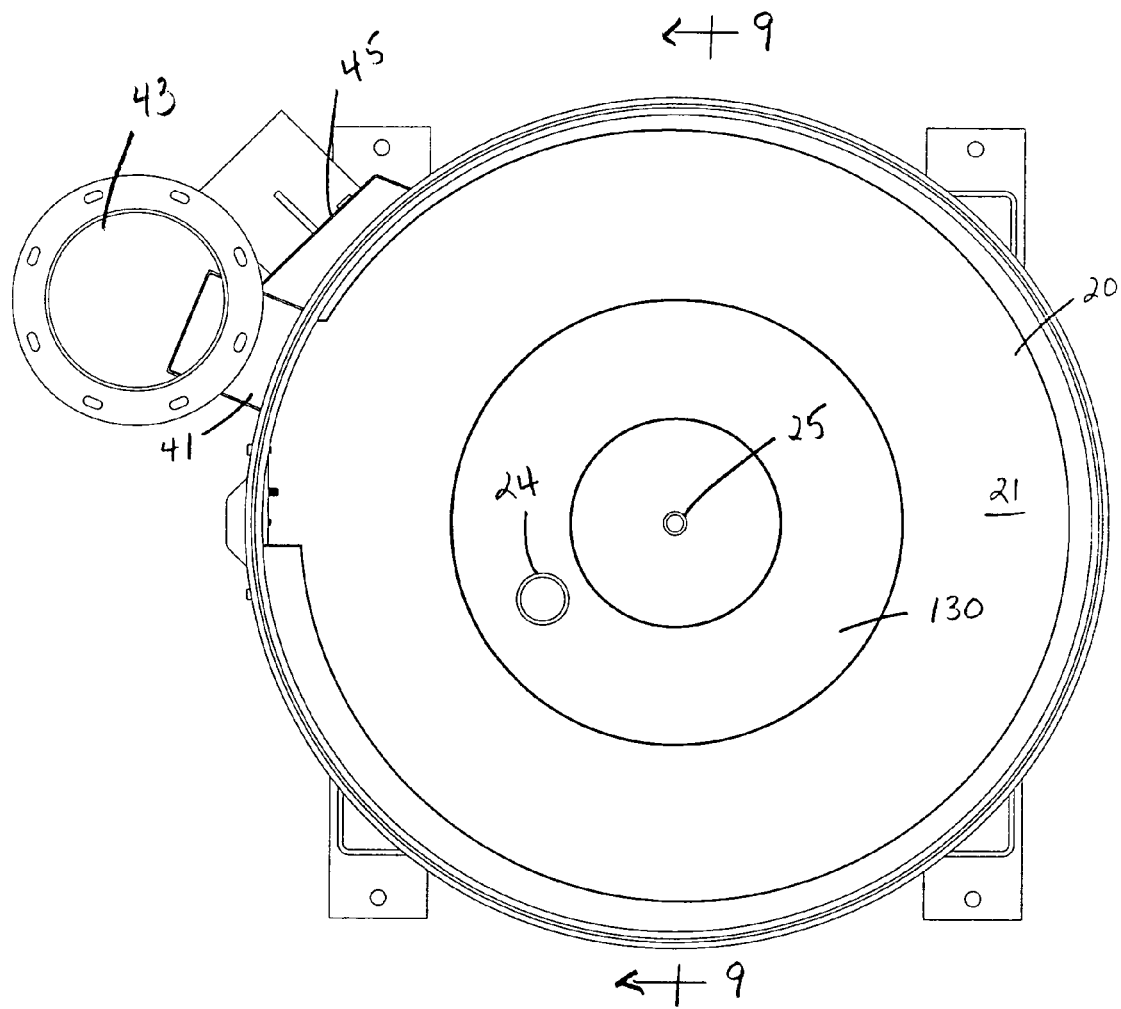
FIG. 8 is top view of the containment vessel of FIG. 7.
Figure 9:
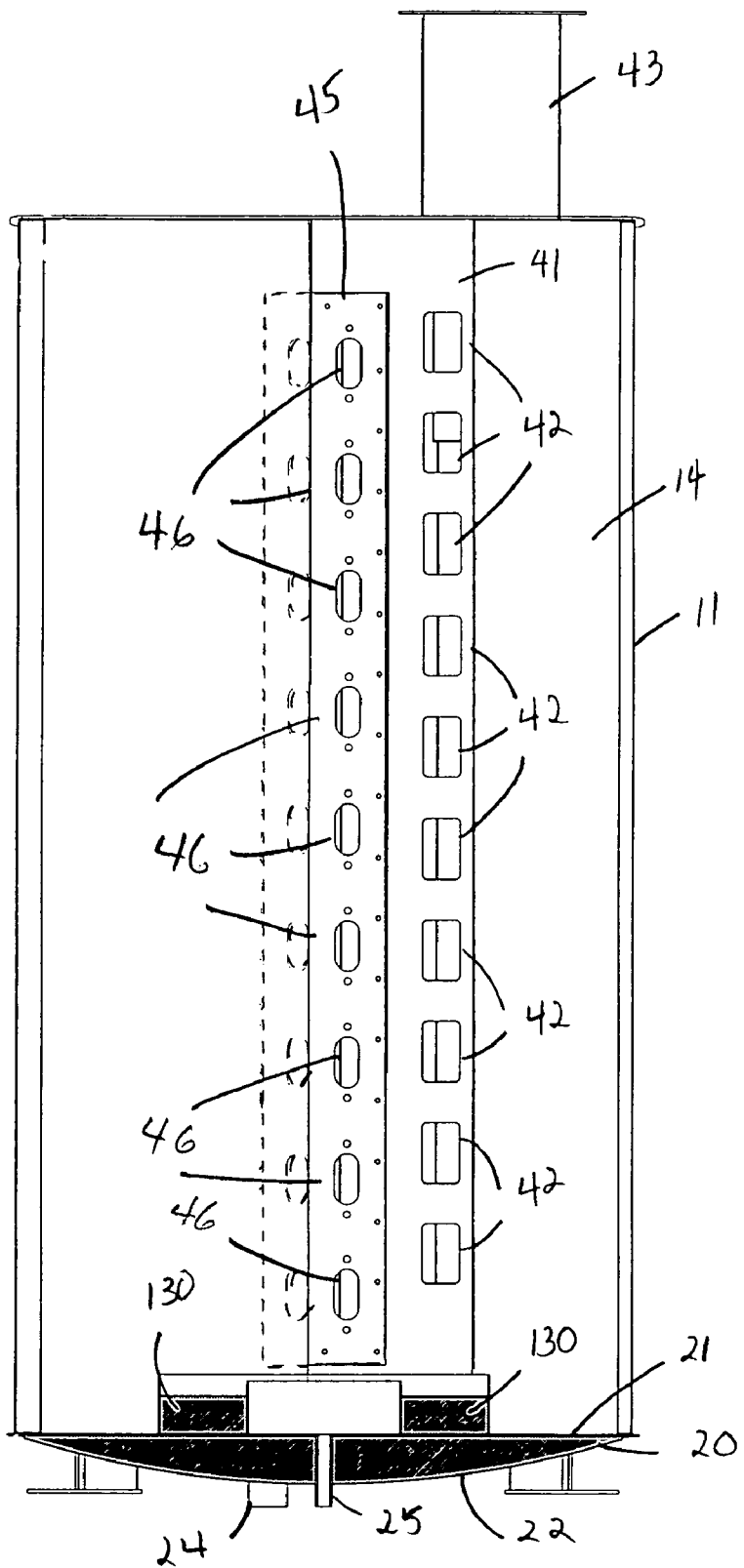
FIG. 9 is a cross-sectional view of the containment vessel of FIG. 7 along the line 9-9 of FIG. 8.

The bottom cover 20 is comprised of a flat bottom cover plate portion 21 fixedly attached to the containment vessel side wall 11, and a domed bottom cover portion 22 joined to the bottom cover flat plate portion along the periphery of each portion 21, 22. The bottom cover plate 21 and dome 22 define a bottom cover interior 20 filled with insulation 23. The insulation 23 may be perlite. The bottom cover 20 has two tubular apertures formed therein, one aperture being catalyst drain 24 for removal of catalyst and the other aperture being a water drain 25. Both apertures 24, 25 connect the containment vessel interior 14 to a containment vessel exterior. The catalyst drain 24 is formed in that portion of the bottom cover abutting the catalyst chamber 18. The water drain 25 is formed along the central longitudinal axis of the containment vessel 10. See FIGS. 8 and 9.

Referring more particularly to FIGS. 4-6, the top cover 26 is comprised of a flat top cover plate portion 27 removably attached to the containment vessel side wall 11, and a domed top cover portion 28 joined to the top cover flat plate portion along the periphery of each portion 27, 28. The top cover plate 27 and dome 28 define a top cover interior 29 filled with insulation 23. The insulation 23 may be perlite. The top cover 26 has a plurality of tubular apertures formed therein, at least one aperture 30 being a catalyst fill pipe, a central aperture 31 for heater connections, an aperture 32 for thermocouple connections, and an aperture 33 for a bypass assembly 100. All top cover apertures 30, 31, 32, 33 connect the containment vessel interior 14 to a containment vessel exterior.

The bottom cover 20 includes a cylindrical containment 130. The bottom cover containment 130 projects upward from the bottom cover plate 21 and is filled with insulation 36. The inner and outer diameters of the bottom cover containment 130 are approximately equal to the inner and outer diameters of the catalyst chamber 70. The upward facing surface 131 of the bottom cover containment provides the lower boundary of the catalyst chamber 70. The top cover 26 also includes a cylindrical containment 132 projecting downward from the top cover plate 27 and is filled with insulation 36. The inner and outer diameters of the top cover containment 132 are approximately equal to the inner and outer diameters of the catalyst chamber 70. The downward facing surface 133 of the top cover containment 132 provides the upper boundary of the catalyst chamber 70.

Figure 2:
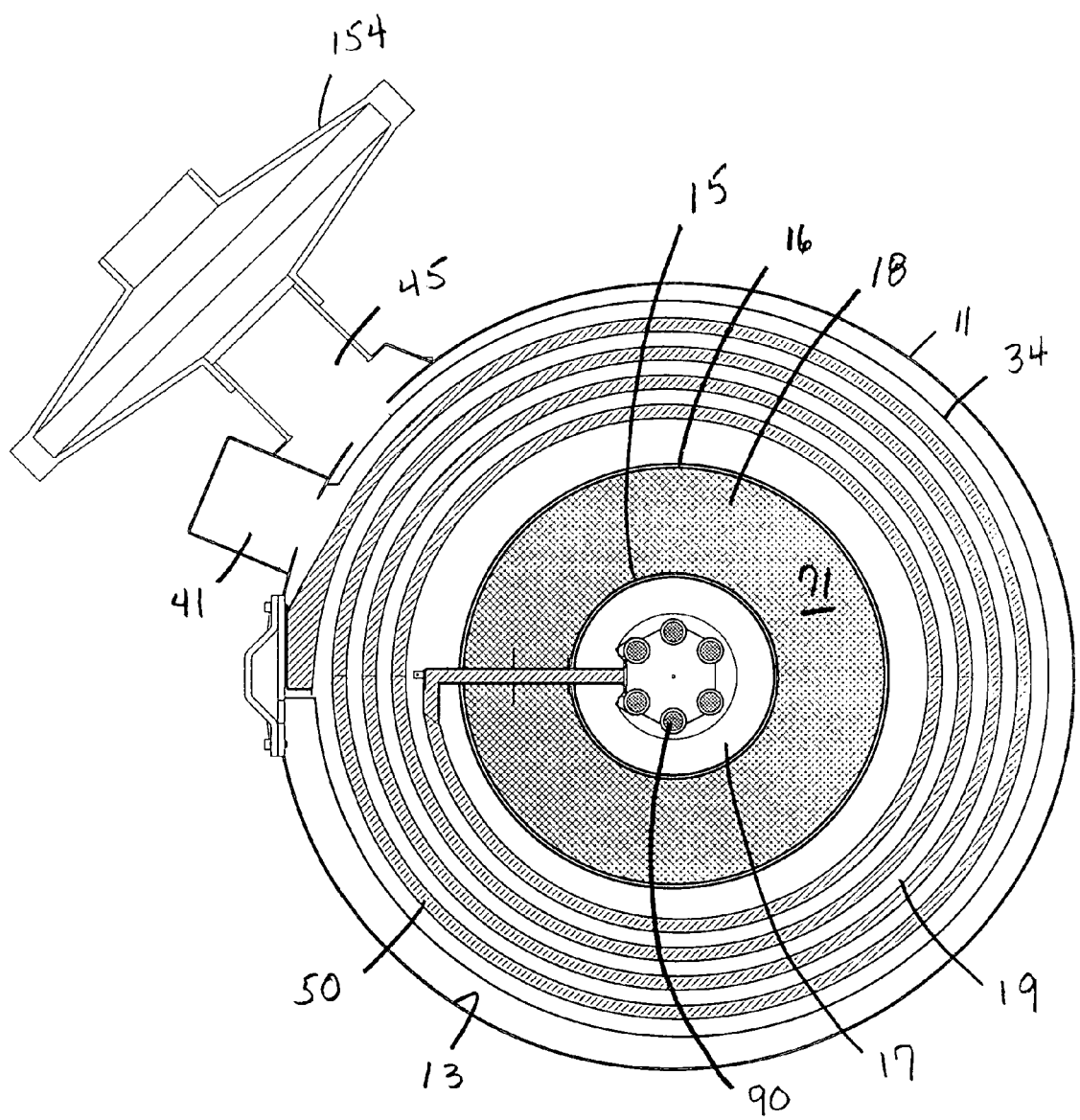
FIG. 2 is a cross-sectional view of the oxidizer of FIG. 1 along the lines 2-2.
Figure 3:
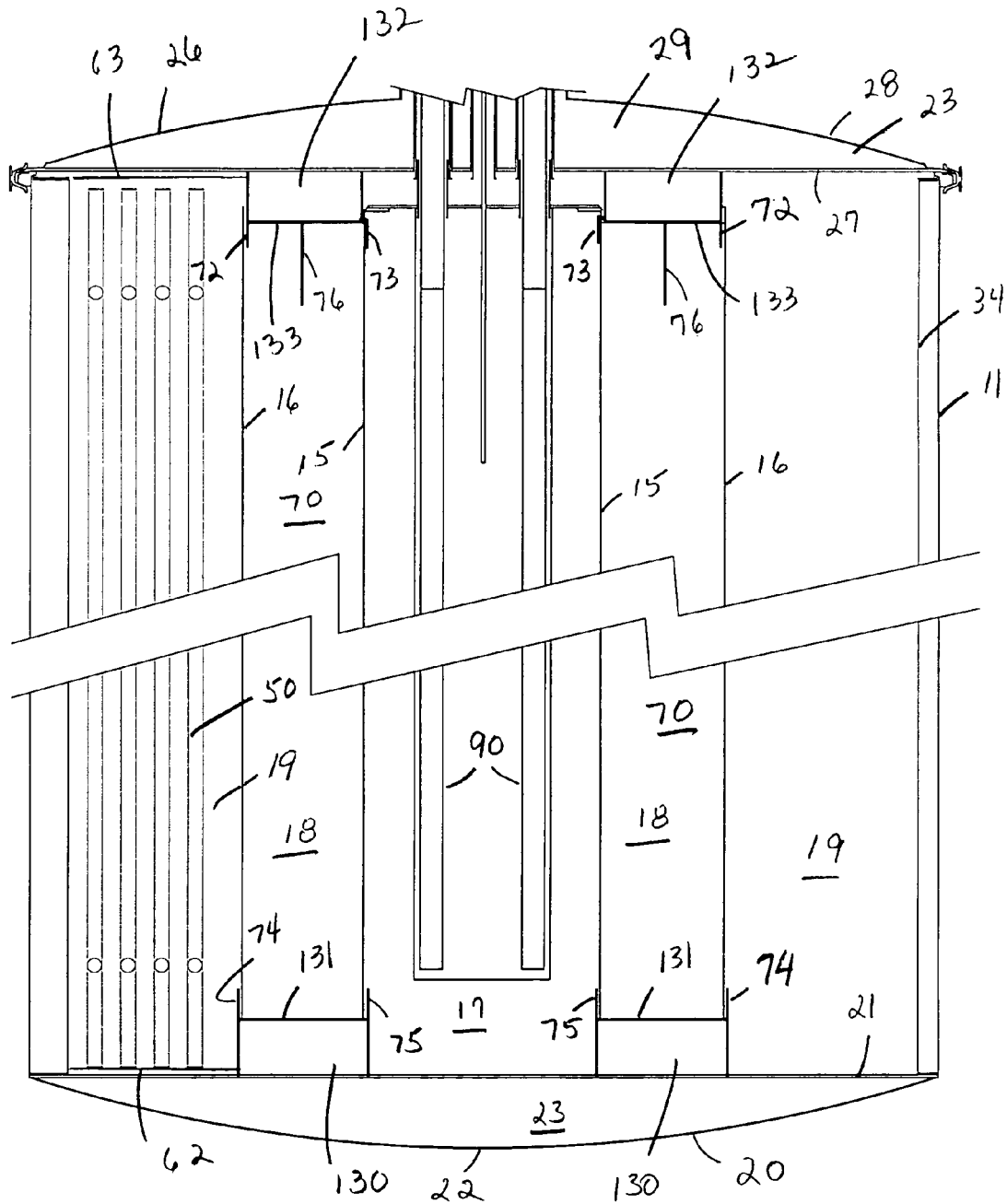
FIG. 3 is a vertical cross-sectional view of the oxidizer.
Figure 7:
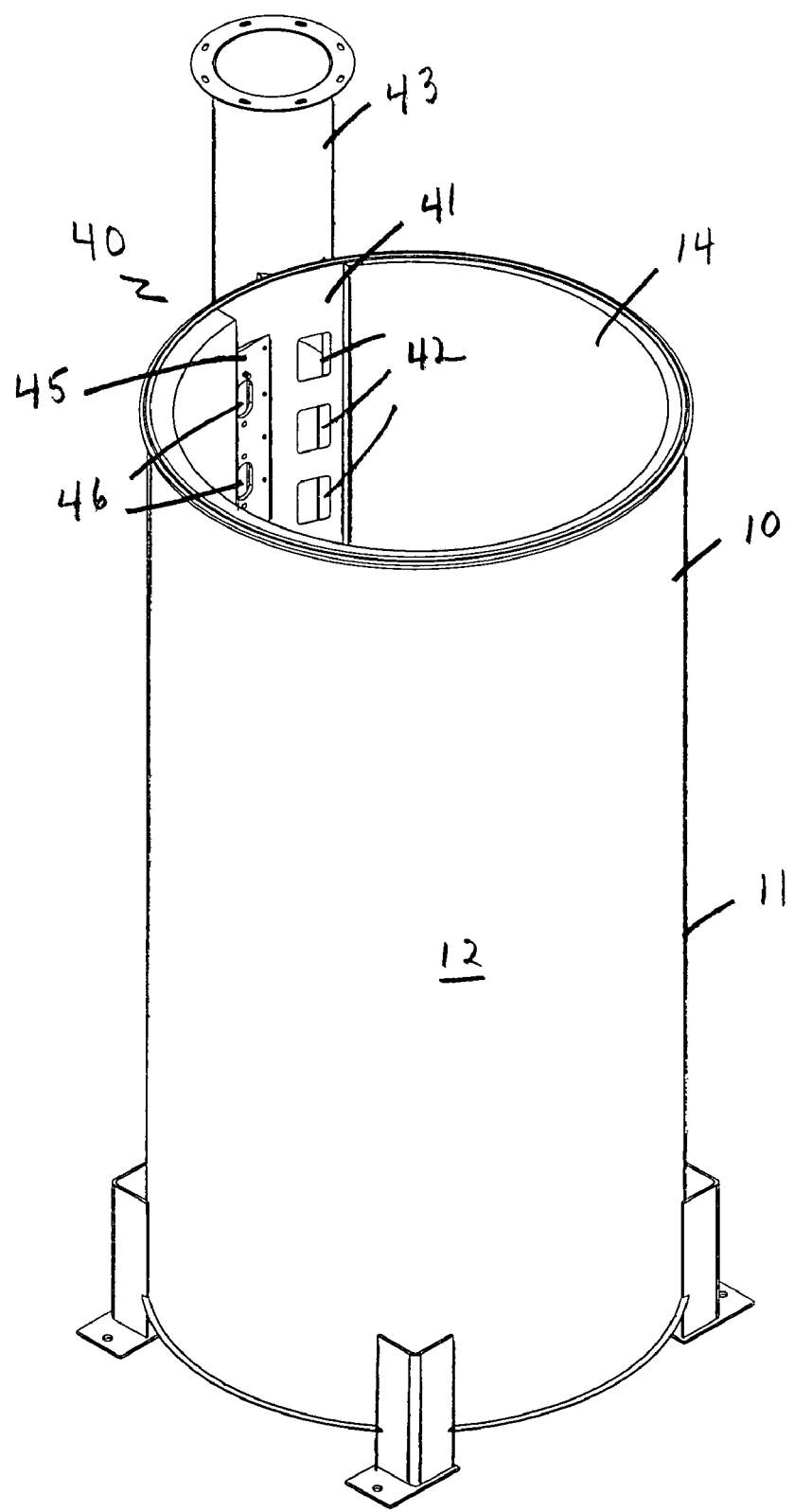
FIG. 7 is a perspective view of the containment vessel without top cover.
Figure 13:
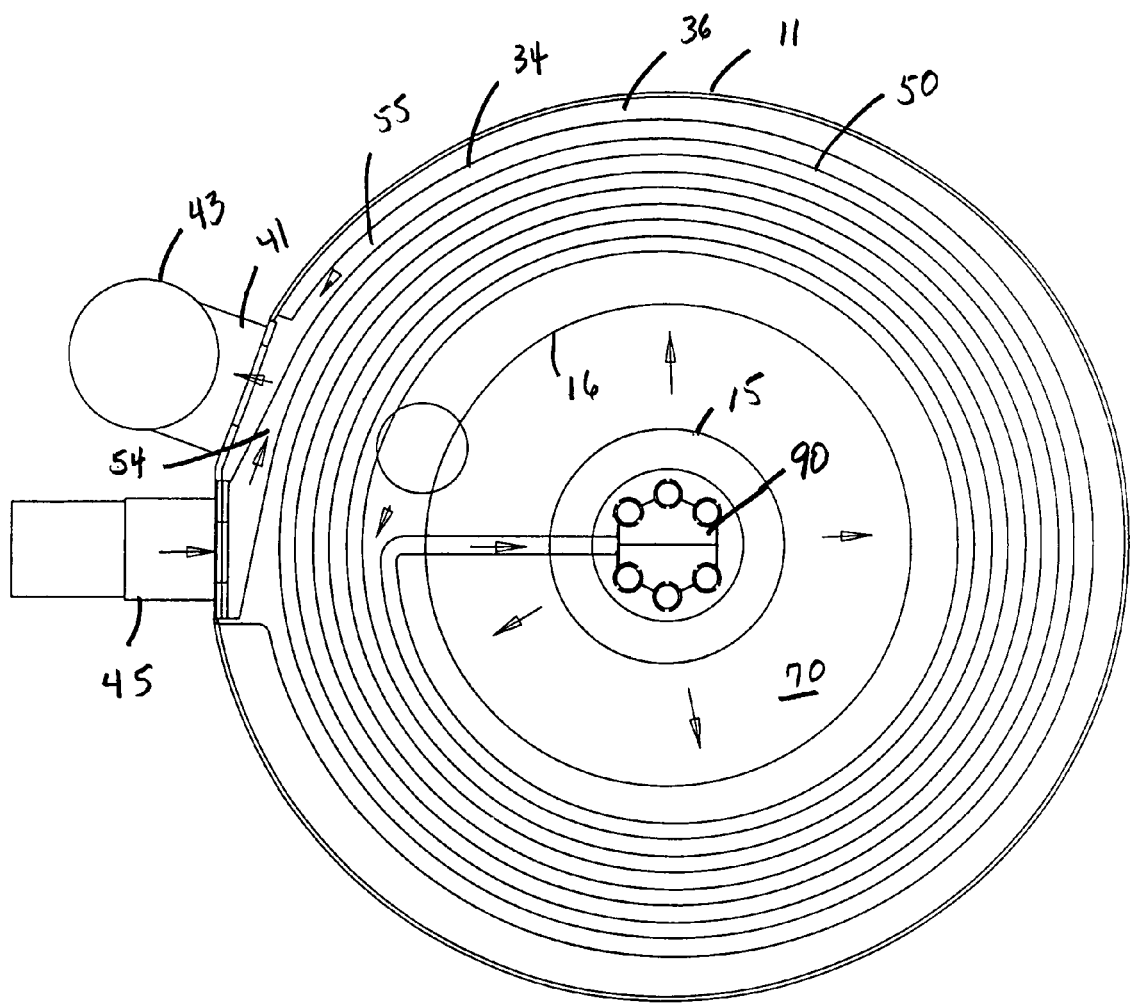
FIG. 13 is a diagrammic horizontal cross-sectional view of the containment vessel with heat exchanger and heater assembly.

Referring more particularly to FIGS. 2, 7-9 and 13, the containment vessel side wall 11 has a vertical rectangular plenum section 40 attached to the containment vessel side wall exterior surface and provides conductive flow access between the containment vessel interior 14 and the containment vessel exterior. Referring more particularly to FIGS. 2, 7 and 13, the plenum section 40 is comprised of two vertical and parallel plenums, one an exhaust plenum 41 and the other an inlet plenum 45. The exhaust plenum 41 is comprised of a row of exhaust plenum apertures 42 through the side wall 11 and is in fluid communication with an exhaust stack 43. The inlet plenum 45 is comprised of a row of inlet apertures 46 through the side wall 11 interconnecting an input assembly 150 with the spiral heat exchanger 50.

Figure 10:
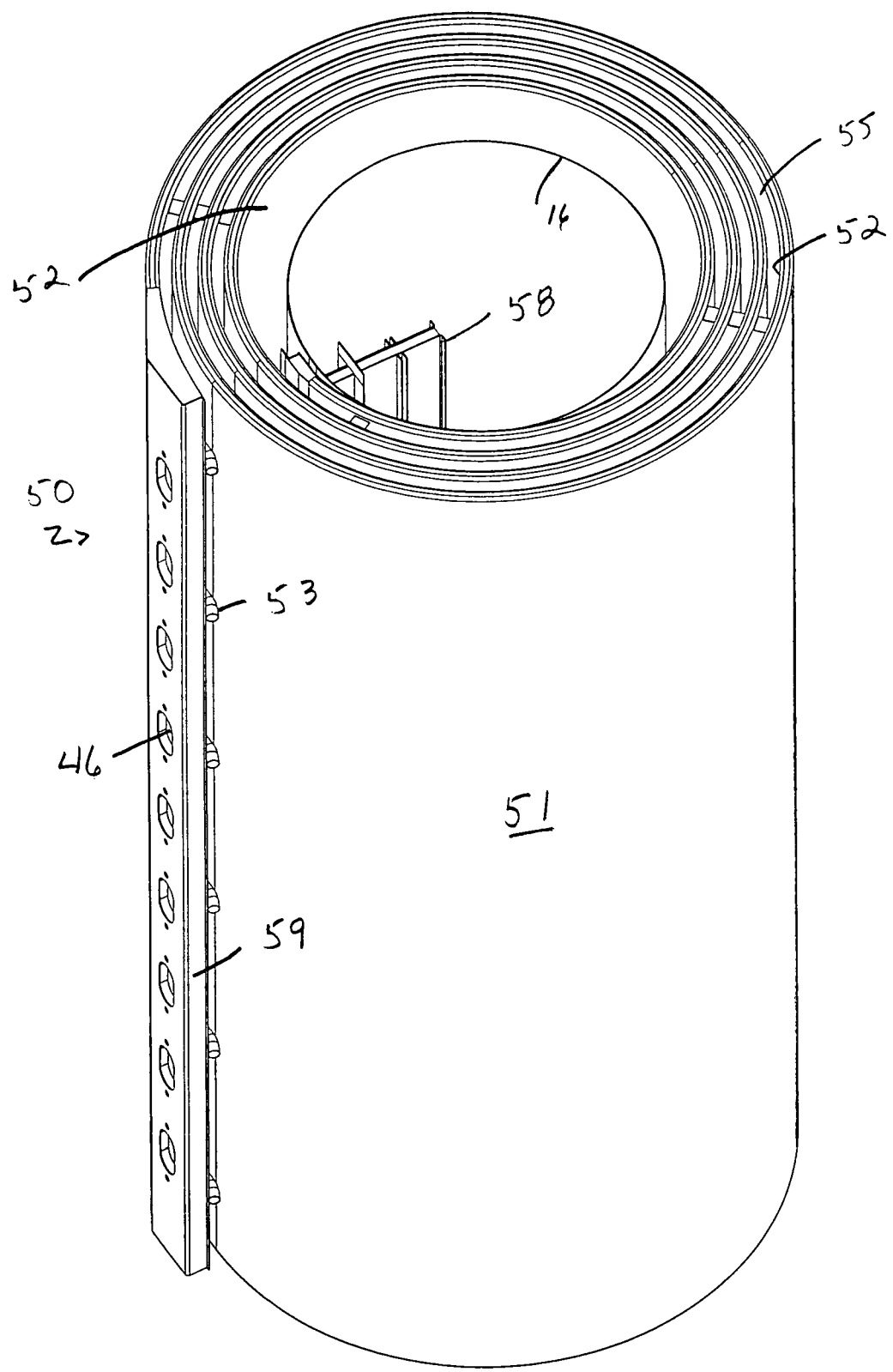
FIG. 10 is a top perspective view of the heat exchanger with outer screen.
Figure 11:
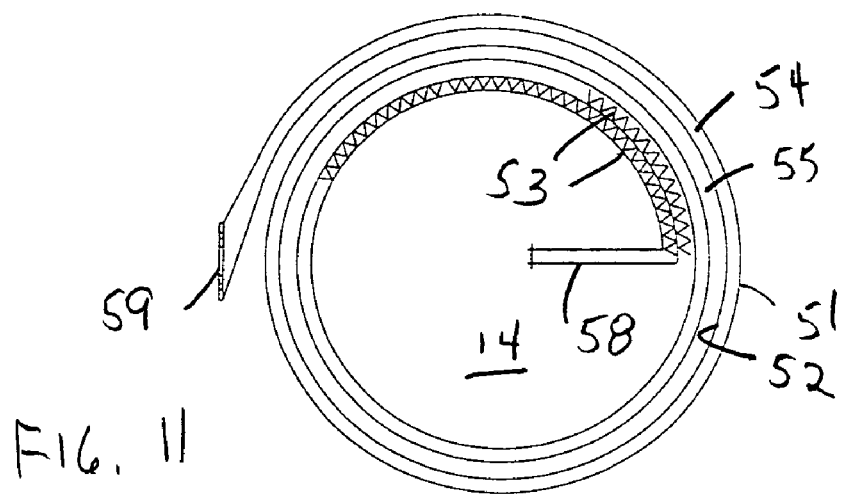
FIG. 11 is a diagrammic top view of a portion of the invention heat exchanger.
Figure 12:
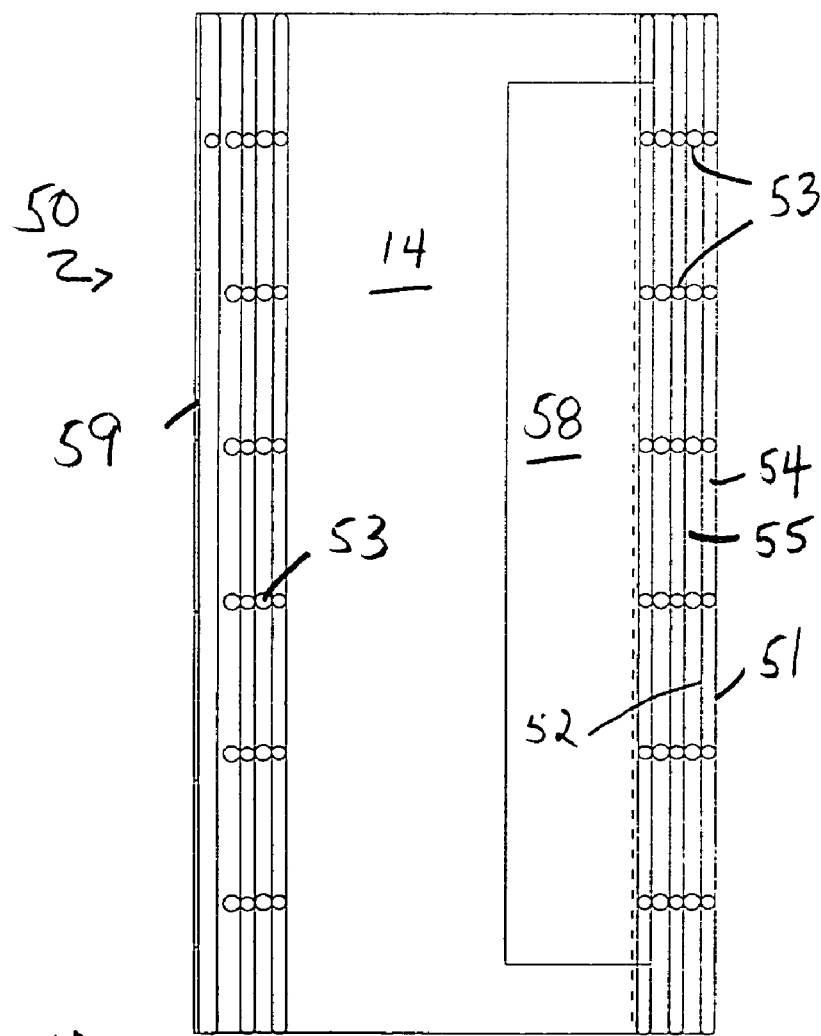
FIG. 12 is a diagrammic vertical cross-sectional view of a portion of the invention heat exchanger.

Referring more particularly to FIGS. 10-12, the spiral heat exchanger 50 is formed by winding two metal strips 51 and 52 over a plurality of flexible spacers 53 forming coils within the annular space 19 between the outer screen plate 16 and the containment vessel side wall interior surface 14. The longitudinal edges of the strips 51 and 52 are formed and welded together, forming a sealed spiral passage 54. The sealed spiral passage 54 may be described as a flat spiral tube. Two spiral flow paths result, one inside sealed passage 54 and the other path external to the sealed passage in the space between the coils, i.e., the outlet passage 55. The spacers 53 may, for example, be coiled wire helix, like compression springs with widely spaced coils. The spacer diameters establish the widths of the spiral passage spaces 54 and 55 formed between the two spiral wound strips 51 and 52, said spacers 53 occupying the full lengths of the strips 51 and 52 setting the widths of the passages 54 and 55. For clarity, only short segments of spacers 53 are shown in FIG. 12. The flat spiral tube 54 has two ends, an inlet end 56 and an outlet end 57. The flat spiral tube outlet end 57 terminates in a flat, radially disposed duct 58, said duct connecting to the heater chamber 17. The duct 58 passes through and is closely fitted to the screen plates 15 and 16. The duct 58 is spaced from the lower catalyst chamber boundary 131, and is substantially spaced from the upper catalyst chamber boundary 133. Consequently, the duct 58, in its passage through the catalyst chamber 70, is completely submerged in the catalyst material 71.

The containment vessel 10 is further comprised of a first radial gasket 62 sandwiched between the bottom cover plate 21 and the lower edges of the flat spiral tube 54, and a second radial gasket 63 sandwiched between the top cover plate 27 and the upper edges of the flat spiral tube 54. The gaskets 62 and 63 serve to confine the exhaust flow to the spiral passage 55. The gaskets 62 and 63 are generally comprised of a compliant woven ceramic or glass fiber, and compensate for movements due to thermal expansion differences, while blocking radial flow across the upper and lower edges of the flat spiral tube 54. See FIG. 3.

To contain the packed bed of catalyst particles 71 a first annular flange 72 projects downward from the bottom of the top cover cylindrical containment 132 overlapping the inside of the outer cylindrical screen plate 16. A second annular flange 73 projects downward from the top cover cylindrical containment 132 overlapping the outside of the inner cylindrical screen plate 15. A third annular flange 74 projects upward from top of the bottom cover containment 130 into the entry space 61, overlapping on the outside of the outer cylindrical screen plate 16. A fourth annular flange 75 projects upward from the top of the bottom cover containment 130 into the heater chamber 17, and overlapping the inside of the inner screen plate 15. The overlapping connections provide for movement due to thermal expansion while containing the catalyst material. The clearances in these overlapping connections are small enough to contain the packed bed of catalyst particles 71. A fifth annular flange 76 projects downward from the bottom of the top cover containment 132 into the catalyst chamber 18. The fifth annular flange 76 preferably has an approximate diameter at a midway between the diameters of the inner and outer screen plates 15, 16. The fifth annular flange 76 prevents by-passing of flow through gaps at the top of the catalyst bed 71 that may arise from settling. See FIG. 3.

The catalyst chamber 18 is packed with particulate catalyst 71. The heater chamber 17, catalyst chamber 18, and the initial entry space 61 leading into the outlet passage 55, all provide conductive regions so that the pressure within each of these spaces is approximately uniform. In this way, a uniform radial flow is created through the packed bed catalyst 71 and the electric heater elements of the heater assembly 90.

A bypass assembly 100 is attached to the top cover 26 and interconnects the entry space 61 to the exhaust plenum 41. The bypass includes a butterfly valve 101. The valve 101 may be operated either manually or automatically. The automatic operation (described in detail below) of the valve 101 responds to the temperature of gas flowing through the valve 101, opening progressively as the temperature rises above a certain level. By adjusting the flow through the bypass passage 102, a variable portion of the flow from the catalyst by-passes the heat exchange passage 55. In this way heat recovery is reduced to enable operation at high input concentrations without overheating.

FIG. 13 illustrates a simplified version of the present invention. The containment vessel 10 includes an inner wall 34. The vessel side wall 11 and inner wall 34 enclose insulation 36. The flat spiral tube inlet end 56 terminates with a flange 59. See FIG. 10. The flange 59 is bolted to the containment vessel side wall interior surface 13; is connected to the inlet plenum 45; and is comprised of a vertical column of inlet holes 60 corresponding to the inlet plenum apertures 46. Thus, the flange 59 provides a conductive flow connection through the containment vessel side wall 11 to the inlet plenum 45.

Figure 14:
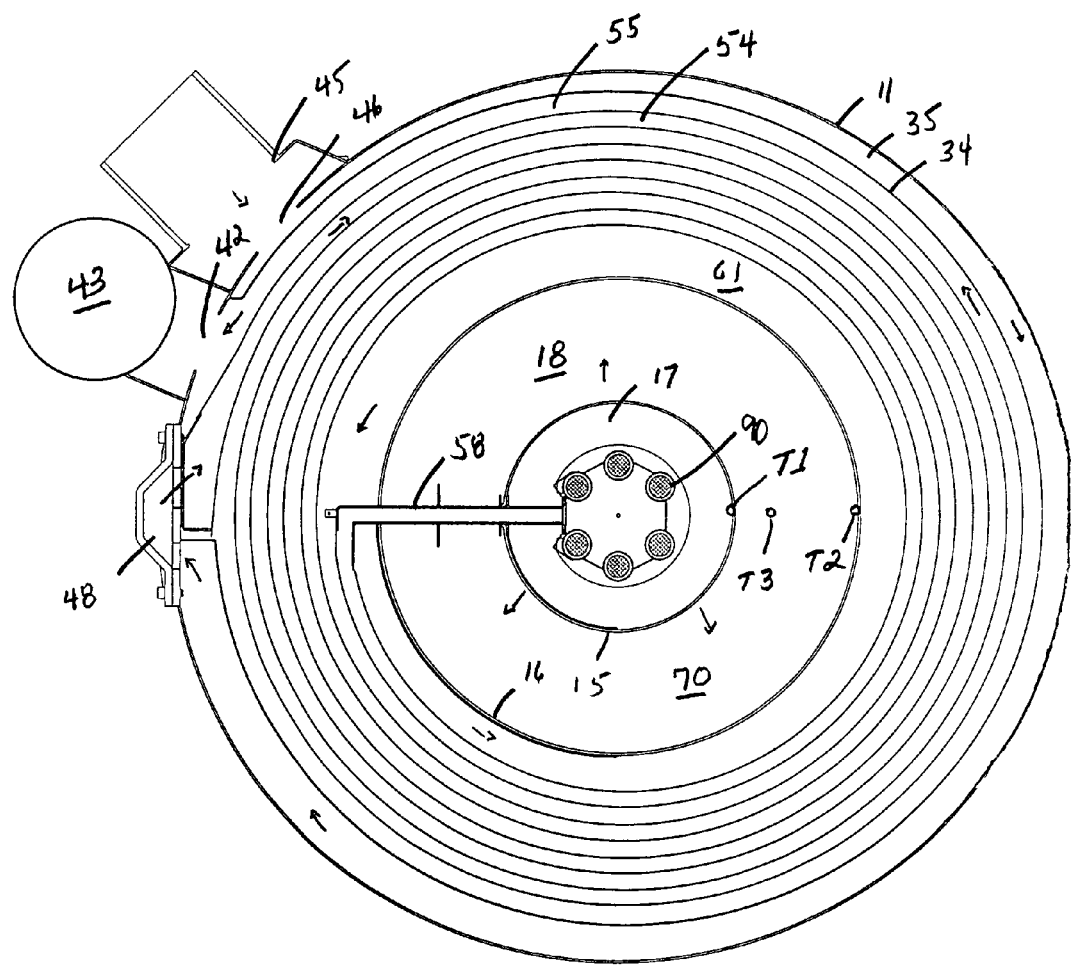
FIG. 14 is a diagrammic horizontal cross-sectional view of an alternate embodiment of the containment vessel with heat exchanger and heaters.
Figure 15:
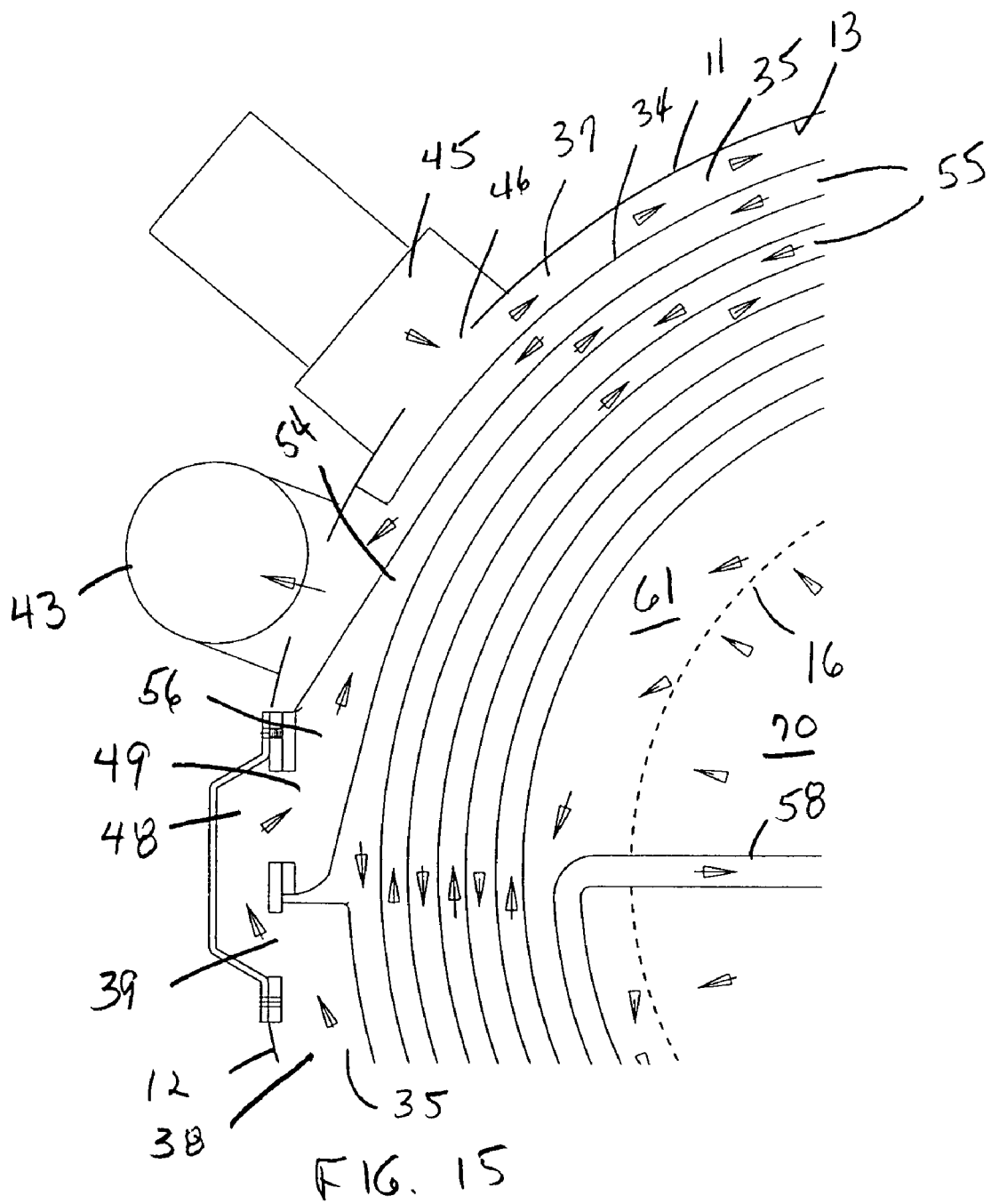
FIG. 15 is a diagrammic close-up view of the inlet and outlet portions of the embodiment shown in FIG. 14.

Referring to FIGS. 14 and 15, an alternate and preferred embodiment of the invention is shown. The space 35 between the vessel side wall 11 and inner wall 34 is an open passage rather than being filled with thermal insulation. The inlet plenum apertures 46 open into the open passage 35 at an open passage upstream entry end 37. The open passage downstream end 38 terminates in a vertical row of apertures 39 formed in the containment vessel sidewall 11. The open passage downstream apertures 39 open into a an enclosed passage 48 attached to the containment vessel sidewall exterior surface 12. The enclosed passage 48 has a plurality of vertically spaced openings 49 connecting the enclosed passage 48 with the spiral heat exchanger flat spiral tube inlet end 56.

In operation, a low temperature hydrocarbon-air vapor mixture to be reacted enters the containment vessel 10 through the inlet plenum 45 and is preheated while passing through the open passage 35 and through the flat spiral tube 54. Heat from the outbound exhaust flow in passage 55 is transferred to the incoming vapor mixture in the open passage 35 and the flat spiral tube 54. From the duct 58 vapor mixture enters the heater chamber 17. When needed, the heater assembly 90 is activated to further heat the vapor mixture to reaction temperature. The vapor mixture then flows radially outward from the heater assembly 90 to the heater chamber 17, and then through the catalyst chamber 18. The reaction inside the catalyst 71, i.e., oxidation of the vapor mixture into an exhaust gas containing carbon dioxide and water, further increases the gas temperature. The exhaust gas moves outward from the catalyst chamber 18 and enters the outlet passage 55. As the exhaust gas moves outward through the outlet passage 55, heat from the exhaust gas is transferred to incoming vapor mixture flowing in the spiral tube 54, thereby dropping the temperature of the exhaust gas. The spiral tube inlet end 56 and the exhaust passage outlet end at the exhaust plenum 41 are at relatively low temperatures. The higher temperatures are in the containment vessel interior adjacent the outer cylindrical screen plate 16. Having high temperatures confined to the interior and relatively low gas temperatures at the outer region, near the containment vessel side wall 11, minimizes conductive heat losses. In the simplified invention version shown in FIG. 13, heat losses are further reduced by the thermal insulation 36 filling the space passage 35. In the preferred invention version shown in the other figures, incoming vapor mixture is sent through the open passage 35. The inner wall 34 then becomes a heat transfer surface transmitting heat to the incoming vapor mixture. The heat from the outer surface of the inner wall 34 is carried with the incoming vapor mixture into the flat spiral tube 54. Thus, the incoming flow carries heat inward minimizing heat loss from the side wall 11.

When operating with a low heating value source vapor, e.g., less than 2 BTU per cubic feet of flow, heat transfer is supplemented by electric heater assembly 90 in the heater chamber 17 before the vapor mixture enters the catalyst chamber 18. In operation with a vapor mixture source having substantially higher heating value, e.g., greater than 5 BTU per cubic feet of flow, more combustion heat is recovered in the heat exchanger 50 than needed to preheat the incoming vapor. In cases when surplus combustion heat can be recovered in the heat exchanger 50, maintaining thermal equilibrium and preventing overheating ideally involves two cooperating mechanisms, automatic dilution control and control of the bypass valve 101.

The dilution control 140 automatically responds to thermocouples T1, T2, and T3 measuring the catalyst inlet, outlet, and interior temperatures. See FIG. 20. The dilution control system 140 consists of the motor driven vapor control valve 141 and a set of three controllers 142, 143, 144 making valve adjustments in response to outputs from the three thermocouples, T1, T2 and T3, respectively. T1 transmits the catalyst entrance temperature. T2 transmits the catalyst exit temperature. T3 indicates the temperature at an intermediate position within the catalyst. If the T1 temperature is at or below a set point, the T1 controller 142 will call for valve adjustments to increase vapor concentrations. These adjustments are repeated until the T1 temperature rises a little above the set point and sufficient heat is recovered to maintain this entrance temperature with minimal operation of the electric heater assembly 90. If source vapor concentration increases, the catalyst interior and exit temperatures will increase. If these temperatures approach maximum safe limits, the T2 or T3 controllers 143, 144 will respond by increasing dilution to bring the temperatures under control.

At a low input concentrations, the electric catalytic oxidizer 1 is operated with the bypass assembly valve 101 fully closed. With the valve 101 closed, heat recovery is maximized and electrical usage for operating the heater assembly 90 to preheat the vapor mixture is minimized. Economical operation at low input concentrations requires high heat recovery efficiency. With high source vapor concentrations, it is necessary to dilute the vapor mixture to a safe maximum level for treatment in the containment vessel 10. The maximum permitted inlet vapor concentration can be increased by reducing heat recovery. Opening the bypass valve 101 allows the dilution control system to operate in a higher range of vapor concentrations, thus increasing productivity when source vapor concentrations are appropriately high. Operation of the bypass valve can be manual or automatic. Reduced heat recovery can be accomplished by manually adjusting the bypass assembly valve 101. Alternatively, automatic operation of the bypass assembly valve 101 responding to the temperature of gas flowing through the valve 101, opening progressively as the temperature rises above a certain level, may be done with a thermal actuator 110.

Referring more particularly to FIGS. 16-19, there is illustrated a preferred automatic mechanism for controlling the bypass valve 101 with a thermal actuator 110. The thermal actuator 110 is comprised of a refractory alloy spring frame 120 enclosing a fused quartz column 111. End buts 116 on the ends 112 of the quartz column 111 transmit an axial load from the quartz column ends 112 to the inside radius 121 at the ends 122 of the frame 120. Operation of the actuator 110 depends upon the difference in thermal expansion coefficients between the quartz column 111 and the alloy frame 120. So called super-alloy 718 is especially suitable for construction of the frame 120 due to its high yield stress and oxidization resistance at temperatures up to 650° C. Fused quartz has physical properties uniquely suited for the column 111, having high compressive yield strength to temperatures above 650° C., and having an extremely low coefficient of thermal expansion. The difference in expansion coefficients between the fused quartz column 111 and the alloy frame 120 is approximately $13 \times 10^{-6}$/° C. The operation of the actuator 110 depends on this difference in expansion due to temperature change. Operation of the thermal actuator 110 also depends on its unique geometry which converts very small thermal expansion differences into significant linear displacements needed to operate the by-pass valve 101.

FIGS. 17A and 17B show profile views of the frame 120 parallel to the bend axes. The frame 120 is comprised of two opposite ends 122 with four substantially straight segments 123, joined by two large angle bends 124 at the frame ends 12 and two small angle bends 125. The two large angle bends 124 wrap around the half cylinder end butts 116 at the ends 112 of the quartz column 111. Each large angle bend 124 has two legs 123 disposed symmetrically on either side of the column 111 and joining the opposite large angle legs 123 at the small angle bends 125. Referring to FIG. 18, there is shown the thermal actuator frame 120 perpendicular to the bend axes 124, 125 of the frame 120 and illustrating the tapered width distribution of the frame 120. The width distribution creates a roughly uniform distribution of bending stress in the frame 120 when it transmits an axial load to the quartz column 111.

Figure 19:
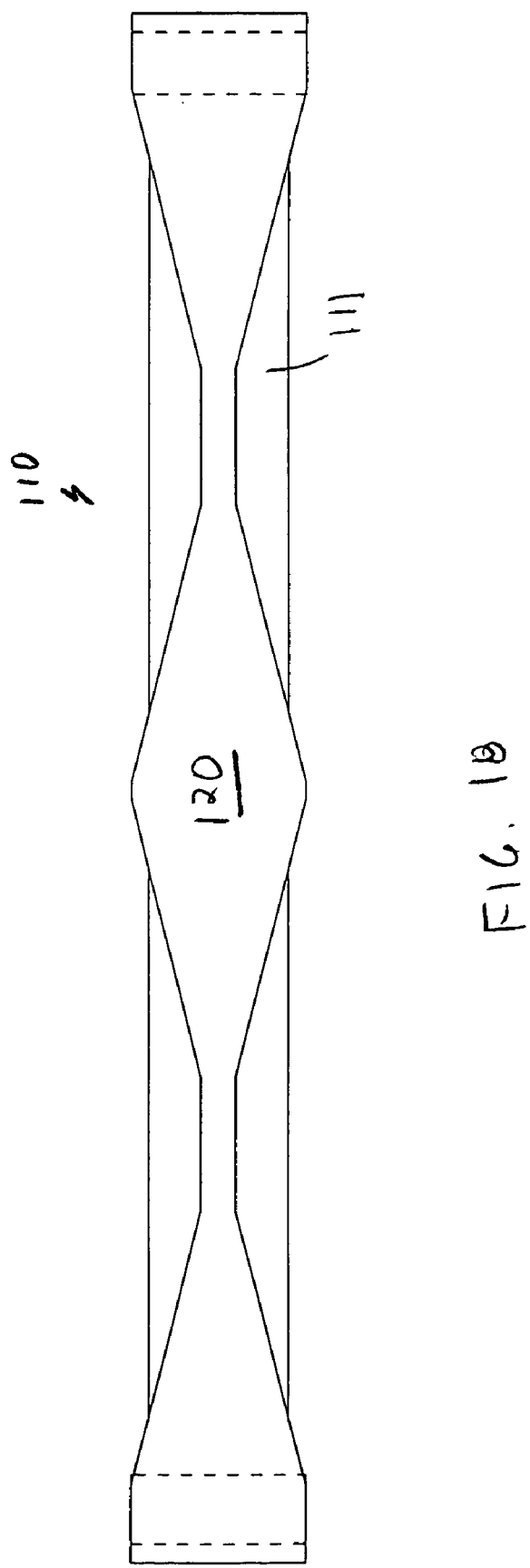
FIG. 19 illustrates the changing elastic deformation of the thermal actuator frame with changes in temperature.
Figure 19:
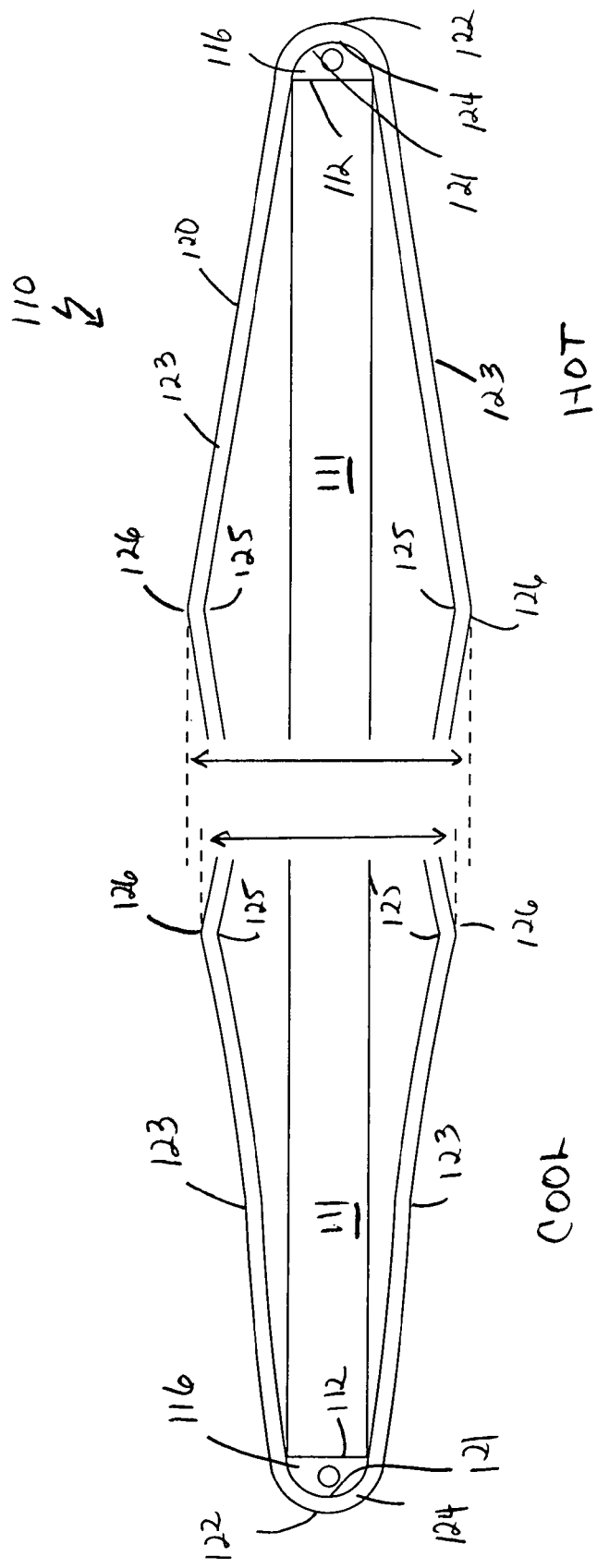

The thermal actuator 110 is assembled by stretching the frame 120 and positioning the column 111 between end butts 116. The actuator 110 is then in a highly stressed condition when at room temperature with superposed bending moments. In this highly stressed condition, at low temperatures, the small angle bends 125 are drawn toward each other so that the distance, W, between them is at a minimum. FIG. 19 illustrates the changing elastic deformation of the frame 120 with increasing temperature. At low temperature the cusps 126 of the small angle bends 125 are pulled closer together. Increasing temperature is accompanied by decreasing tension and decreasing bending moments in the frame 120. Increasing temperature decreases curvature and increases the mid-plane length of the frame 120. As a result, with increasing temperature, W increases in magnitude. Decreasing curvature contributes a small percentage to the increase in width, W, along with the increasing length as measured on the center planes of the legs 123.

Figure 16:
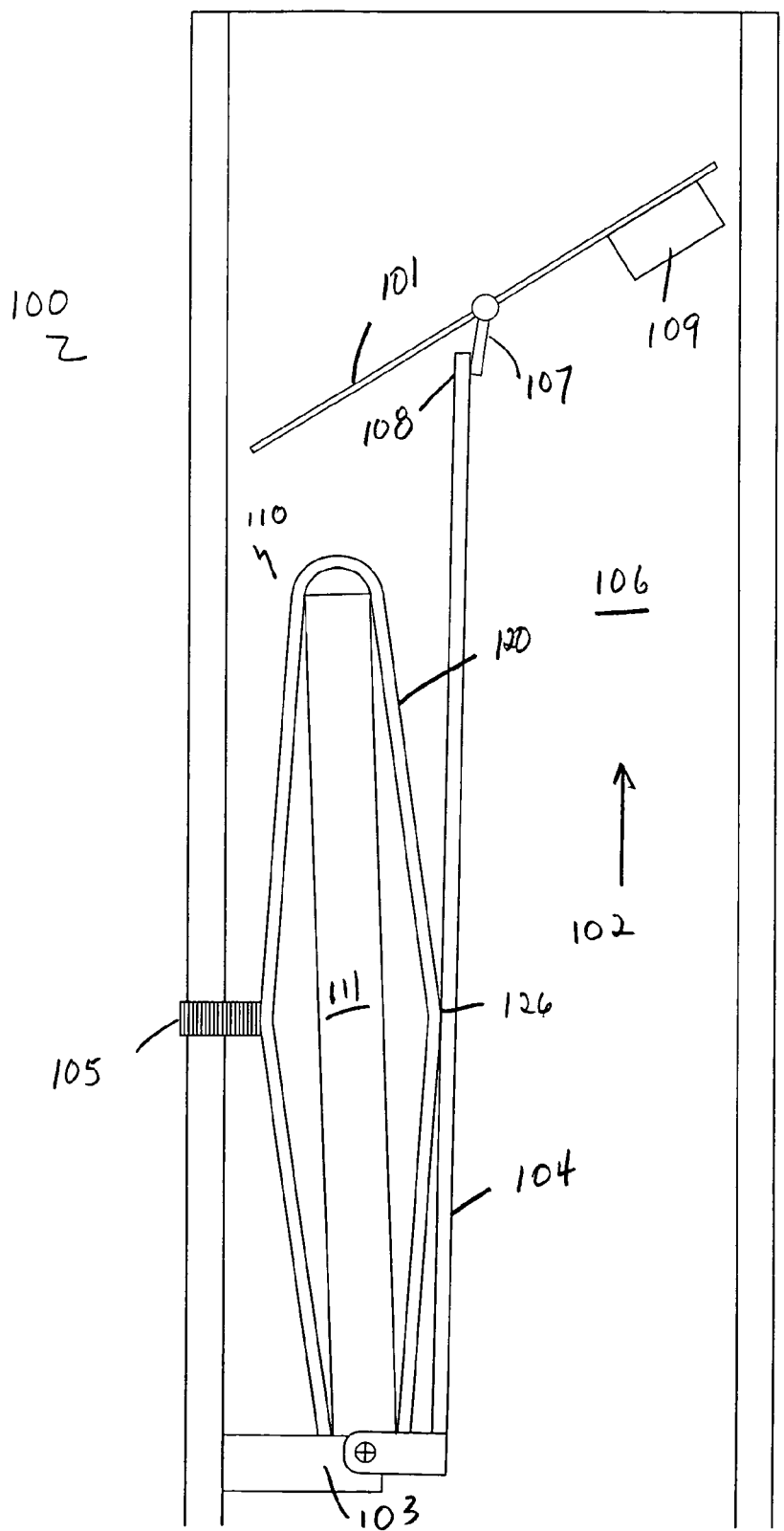
FIG. 16 is a side view of a thermal actuator operationally attached to an air input butterfly valve.

Referring more particularly to FIG. 16, the thermal actuator 110 is illustrated mounted for operation inside the bypass assembly 100. The thermal actuator 110 is vertically mounted on a pivot bracket 103 inside the bypass assembly 100. An actuator operating arm 104 is also pivotally mounted on the pivot bracket 103. An adjustment screw 105 is horizontally mounted into the bypass assembly interior 106. The actuator frame 120 is sandwiched between the adjustment screw 105 and the actuator operating arm 104. The upper end 108 of the actuator operating arm 104 engages a protruding element 107 fixedly attached to said valve 101. A ballast weight 109 is attached to one end of the butterfly valve 101.

The adjustment screw 105 is set so that at low temperatures the thermal actuator frame value W is less than the distance between the adjustment screw 105 and the actuator operating arm 104. With this condition, the valve 101 is held closed by the ballast weight 109. As the temperature within the bypass passage 102 increases, the value of W increases until the actuator operating arm upper end 108 is displaces against the element 107. With further increases in temperature, the valve 101 begins to open. By adjusting the adjustment screw 122, the temperature at which the valve 101 begins to open is increased or decreased. As the valve 101 opens, the heat recovery efficiency declines and the dilution control system automatically increases vapor concentration. The thermal actuator 110 provides progressive valve adjustment above a selected temperature. The geometry and mounting of the thermal actuator 110 amplifies extremely small differential thermal expansion into significant displacements for valve operation.

Figure 20:
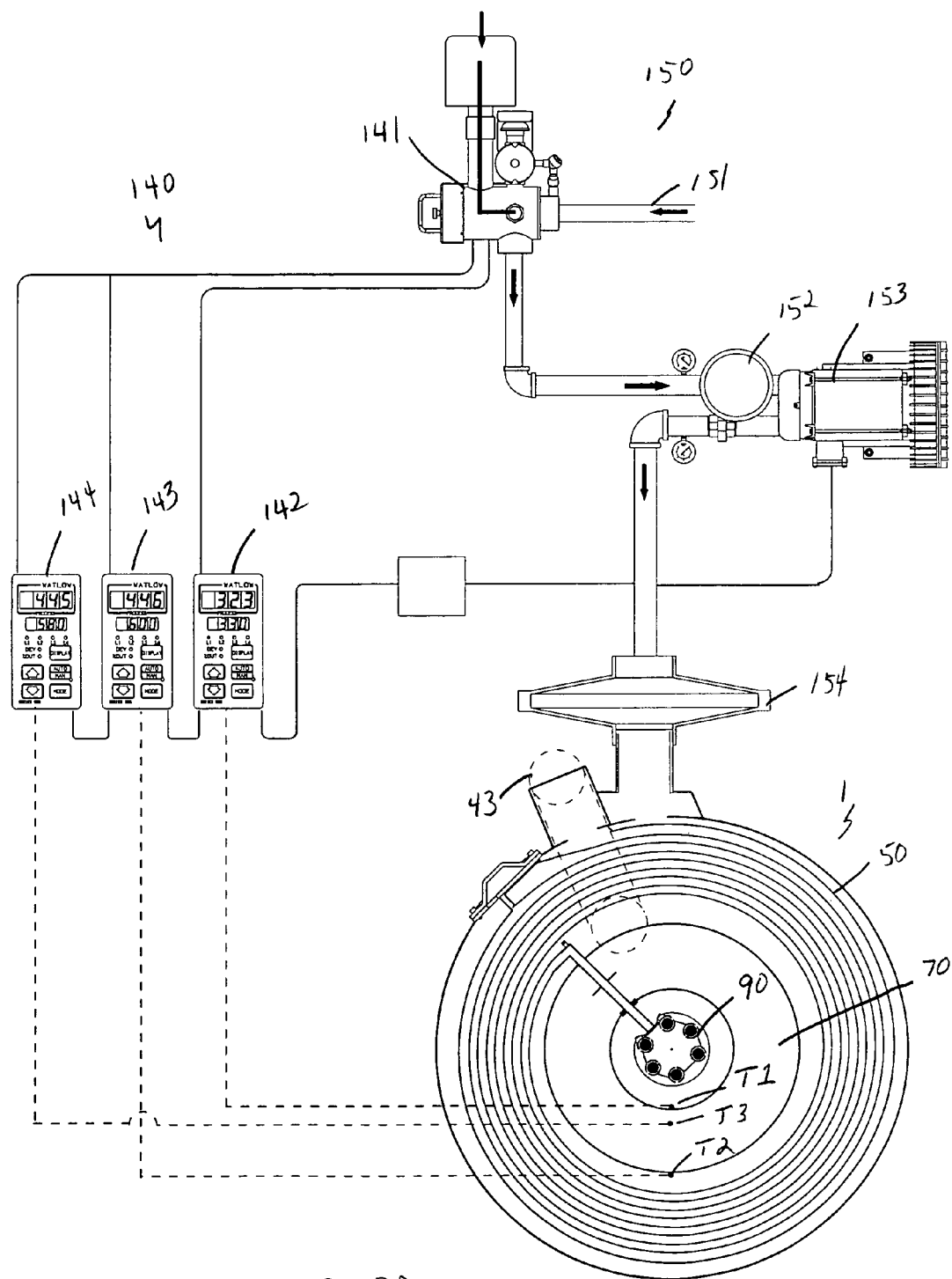
FIG. 20 is a system flow and control diagram.

Referring more particularly to FIG. 20 there is shown the input assembly 150 in conjunction with the electric catalytic oxidizer 1. Vapor to be treated is brought into a vapor inlet 151. Dilution air is brought in through the vapor control valve 141. The opening of the vapor control valve 141 is controlled by the controllers 142, 143, 144 as described above. The resulting combined vapor-air mixture is brought through a filter 152 and is driven by a blower 153 through a flame arrestor 154 into the oxidizer 1 via the inlet plenum 45.

It is understood that the above-described embodiment is merely illustrative of the application. Other embodiments may be readily devised by those skilled in the art which will embody the principles of the invention and fall within the spirit and scope thereof.

I claim:

1. A catalytic oxidizer for the treatment of a hydrocarbon-air vapor mixture, comprising:
   a containment vessel having a bottom cover from which a cylindrical side wall extends vertically upward, said containment vessel being generally cylindrical in shape, a vertical longitudinal axis of said cylindrical containment vessel being generally perpendicular to the bottom cover of said containment vessel, said containment vessel having a top cover removably connected to said cylindrical side wall, said side wall, top cover and bottom cover defining a containment vessel interior, said side wall having an exterior surface and an opposite interior surface;

a spiral plate heat exchanger coaxially positioned within the containment vessel interior;

a heater assembly centrally positioned within said containment vessel interior;

a catalyst chamber within said containment vessel interior and positioned between said spiral heat exchanger and said heater assembly, said catalyst chamber being packed with particulate catalyst;

wherein said spiral plate heat exchanger, catalyst chamber, and heater assembly occupy successively smaller annular regions within said containment vessel;

a plenum section, vertically disposed along the exterior sidewall surface, said plenum section providing conductive flow access for the hydrocarbon-air vapor mixture to the containment vessel interior, said plenum section comprising:

a vertical exhaust plenum comprised of a vertical row of exhaust plenum apertures through the containment vessel side wall and providing fluid communication with an exhaust stack; and a vertical, parallel inlet plenum comprised of a row of inlet apertures through the containment vessel side wall interconnecting an input assembly with said spiral plate heat exchanger; and a plurality of essential flow pathways interconnecting said plenum section, heat exchanger, catalyst chamber and central heater.

2. A catalytic oxidizer as recited in claim 1, wherein the containment vessel interior is further comprised of:

an inner wall adjacent to and spaced from said containment side wall;

a vertical inner cylindrical screen plate with a vertical longitudinal central axis coincident with the containment vessel vertical longitudinal axis;

a vertical outer cylindrical screen plate with a vertical longitudinal central axis coincident with the containment vessel vertical longitudinal central axis, said outer cylindrical screen plate being positioned between the inner cylindrical screen plate and said inner wall;

wherein the inner screen plate defines a heater chamber containing the invention heater assembly;

wherein a first annular space formed between the inner screen plate and outer screen plate defines a catalyst chamber;

wherein a second annular space formed between the outer screen plate and the containment vessel inner wall holds the invention spiral heat exchanger;

wherein a third annular space formed between the outer screen plate and a first inner coil of the spiral heat exchanger defines an outlet passage entry space.

3. A catalytic oxidizer as recited in claim 2, wherein:

the spiral plate heat exchanger is formed by winding two metal strips over a plurality of flexible spacers forming coils within the second annular space, said strips having longitudinal edges formed and welded together, forming a sealed spiral passage resulting in two spiral flow paths, one path an inside sealed passage forming an inlet passage and the other path external to the sealed passage in the space between the coils forming an outlet passage, said inside sealed passage having two ends, an inlet end and an outlet end, said outlet end terminating in a radially disposed duct, said duct opening into the heater chamber, said inlet end being in fluid communication with the inlet plenum, said outlet passage fluidly interconnecting the outlet passage entry space with the exhaust plenum.

4. A catalytic oxidizer as recited in claim 3, further comprising:

a bypass assembly attached to the top cover and interconnecting the outlet passage entry space to the exhaust plenum, said bypass assembly including a valve responsive to a temperature of gas flowing through the valve, opening progressively as the temperature rises above a designated level, thereby causing a variable portion of gas flow from the catalyst to bypass the heat exchange outlet passage.

5. A catalytic oxidizer as recited in claim 4, wherein said plurality of essential pathways comprises:

a low temperature hydrocarbon-air vapor mixture entering the containment vessel from an input assembly through the inlet plenum;

the inlet plenum apertures opening into a space forming an open passage between the containment side wall and inner wall at an open passage upstream entry end, said open passage having a downstream end in fluid communication with the spiral plate heat exchanger inside sealed passage inlet end;

the inside sealed passage outlet end terminating in a duct terminating in the heater chamber;

vapor mixture from the duct entering the heater chamber and the flowing radially outward from the heater chamber through the catalyst chamber;

wherein the heater assembly is adapted to being activated to heat the vapor mixture to a reaction temperature;

vapor mixture moving outward from the catalyst chamber and entering the outlet passage entry space;

wherein the vapor mixture reacts inside the catalyst within said catalyst chamber oxidizing the vapor mixture into an exhaust gas containing carbon dioxide and water, while further increasing the exhaust gas temperature;

exhaust gas moving from the outlet passage entry space through the spiral plate heat exchanger outlet passage to the exhaust plenum; and exhaust gas mixture moving through the exhaust plenum to an exhaust stack;

wherein the vapor mixture moving through the open passage and spiral plate heat exchanger inside sealed passage is preheated from the outbound exhaust flow through the spiral heat exchanger outlet passage.

6. A catalytic oxidizer as recited in claim 5, further comprising:

a dilution control means connected to said input assembly for adjusting a proportion of dilution air admitted to the vapor mixture entering the containment vessel.

7. A catalytic oxidizer as recited in claim 6, further comprising:

a thermal actuator for controlling the bypass valve, said thermal actuator having a refractory alloy spring frame enclosing a fused quartz column with two opposite half-cylinder end butts, said frame comprising two opposite ends with four substantially straight segments, joined by two large angle bends at the frame ends and two small angle bends, each said large angle bends wrapping around a half-cylinder end butt;

wherein the quartz column and alloy frame have different thermal expansion coefficients;

wherein each large angle bend has two legs disposed symmetrically on either side of the column and joining two opposite large angle legs at the small angle bends;

wherein, at low temperatures, said small angle bends are adapted to being drawn toward each other;

wherein, at high temperatures, said small angle bends are adapted to being spaced further from each other.

8. A catalytic oxidizer as recited in claim 7, wherein said bypass assembly is comprised of:

a thermal actuator vertically mounted on a pivot bracket;

an actuator operating arm pivotally mounted on the pivot bracket;

a horizontally mounted adjustment screw;

wherein said actuator frame is sandwiched between the adjustment screw and the actuator operating arm;

an actuator operating arm upper end engaging a protruding element fixedly attached to said bypass assembly valve; and a ballast weight attached to one end of the valve.

9. A catalytic oxidizer as recited in claim 8, wherein the bottom cover is comprised of:

a flat bottom cover plate portion fixedly attached to the containment vessel side wall; and a domed bottom cover portion joined to the bottom cover flat plate portion along a periphery of each portion;

wherein said bottom cover plate portion and domed bottom cover portion define a bottom cover interior filled with insulation;

a plurality of tubular apertures formed in said bottom cover, one of said tubular apertures being a catalyst drain for removal of catalyst and another tubular aperture being a water drain, said tubular apertures connecting the containment vessel interior to a containment vessel exterior.

10. A catalytic oxidizer as recited in claim 9, wherein the top cover is comprised of:

a flat top cover plate portion removably attached to the containment vessel side wall; and a domed top cover portion joined to the top cover flat plate portion along a periphery of each portion;

wherein said top cover plate portion and domed top cover portion define a top cover interior filled with insulation;

a plurality of tubular apertures formed in said top cover, one of said tubular apertures being a catalyst fill pipe, another of said tubular apertures being a central aperture for heater connections, another of said tubular apertures providing thermocouple connections, and another of said tubular aperture for said bypass assembly, said top cover tubular apertures connecting the containment vessel interior to a containment vessel exterior.

11. A catalytic oxidizer as recited in claim 10, wherein the bottom cover includes a bottom cover cylindrical containment filled with insulation and projecting upward from the bottom cover plate portion, said bottom cover cylindrical containment having inner and outer diameters approximately equal to an inner and outer diameters of the catalyst chamber, said bottom cover cylindrical containment having an upwardly facing surface providing a lower boundary of the catalyst chamber;

the top cover includes a top cover cylindrical containment filled with insulation and projecting downward from the top cover plate, said top cover cylindrical containment having inner and outer diameters approximately equal to the inner and outer diameters of the catalyst chamber, said top cover cylindrical containment having a downwardly facing surface providing an upper boundary of the catalyst chamber.

* * * * *